(12) United States Patent
Hong

(10) Patent No.: US 11,760,480 B2
(45) Date of Patent: Sep. 19, 2023

(54) INFORMATION SENDING AND RECEIVING METHOD AND APPARATUS, DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 336 days.

(21) Appl. No.: 17/251,617

(22) PCT Filed: Jun. 14, 2018

(86) PCT No.: PCT/CN2018/091248
§ 371 (c)(1),
(2) Date: Dec. 11, 2020

(87) PCT Pub. No.: WO2019/237300
PCT Pub. Date: Dec. 19, 2019

(65) Prior Publication Data
US 2021/0163134 A1    Jun. 3, 2021

(51) Int. Cl.
*B64C 39/02* (2023.01)
*B64D 45/00* (2006.01)
(Continued)

(52) U.S. Cl.
CPC .......... *B64C 39/024* (2013.01); *B64D 45/00* (2013.01); *H04B 7/18506* (2013.01);
(Continued)

(58) Field of Classification Search
CPC ............ B64C 39/024; B64D 45/00; B64D 2045/0085; H04B 7/18506; H04W 76/19;
(Continued)

(56) References Cited

U.S. PATENT DOCUMENTS 8,521,339 B2 * 8/2013 Gariepy ............... B64C 39/024
                                                701/2
9,412,278 B1 * 8/2016 Gong ..................... G06F 21/44
(Continued)

FOREIGN PATENT DOCUMENTS

CN      101807051 A     8/2010
CN      102508447 A     6/2012
(Continued)

OTHER PUBLICATIONS

International Search Report dated Feb. 22, 2019 in PCT/CN2018/091248 filed on Jun. 14, 2018, citing documents AA-AC and AO-AS therein, 2pages.
(Continued)

*Primary Examiner* — Mussa A Shaawat
(74) *Attorney, Agent, or Firm* — Oblon, McClelland, Maier & Neustadt, L.L.P.

(57) ABSTRACT

The present disclosure provides a method for sending information, method for receiving information, apparatus, device, and storage medium. The method can include an unmanned aerial vehicle (UAV) operating in a first operation mode when the UAV is in an inactive state. Further, the method can include the UAV switching from the first operation mode to a second operation mode different from the first operation mode, and sending, by the UAV, information to an access network device, where the information being used for indicating a change of operation mode of the UAV. The method can further include determining, by the access network device, a second operation mode to which the UAV is switched according to the information, and controlling, by the access network device, the UAV by applying a control strategy corresponding to the second operation mode.

18 Claims, 2 Drawing Sheets

(51) Int. Cl.
*H04B 7/185* (2006.01)
*H04W 76/19* (2018.01)

(52) U.S. Cl.
CPC ..... *H04W 76/19* (2018.02); *B64D 2045/0085* (2013.01); *B64U 2201/10* (2023.01)

(58) Field of Classification Search
CPC ............... H04W 76/27; B64U 2201/10; B64U 2201/00; G05D 1/0022; G05D 1/0061; G08G 5/0013; G08G 5/0069; H04Q 9/00; H04Q 2209/40
See application file for complete search history.

(56) References Cited

U.S. PATENT DOCUMENTS

| | | | |
|---|---|---|---|
| 9,594,372 B1 | 3/2017 | Sills et al. | |
| 9,847,032 B2 | 12/2017 | Postrel | |
| 2009/0219393 A1* | 9/2009 | Vian | G08G 5/0086 701/25 |
| 2010/0302359 A1* | 12/2010 | Adams | H04L 1/0014 375/240.01 |
| 2012/0271461 A1* | 10/2012 | Spata | G01W 1/08 706/45 |
| 2013/0345920 A1* | 12/2013 | Duggan | G05D 1/0061 701/23 |
| 2014/0025230 A1* | 1/2014 | Levien | G05D 1/102 701/2 |
| 2014/0142787 A1* | 5/2014 | Tillotson | H04K 3/224 701/3 |
| 2014/0163852 A1* | 6/2014 | Borri | G08G 5/0034 701/120 |
| 2014/0166816 A1* | 6/2014 | Levien | G05D 1/0088 244/175 |
| 2015/0336668 A1* | 11/2015 | Pasko | G05D 1/00 701/2 |
| 2018/0092157 A1 | 3/2018 | Chen | |
| 2018/0211548 A1 | 7/2018 | Postrel | |
| 2019/0250601 A1* | 8/2019 | Donahoe | G06F 3/0482 |
| 2020/0079507 A1* | 3/2020 | Deng | G08G 5/0069 |
| 2020/0214073 A1* | 7/2020 | Shimoda | H04W 16/32 |

FOREIGN PATENT DOCUMENTS

| | | |
|---|---|---|
| CN | 105676863 A | 6/2016 |
| CN | 107046735 A | 8/2017 |
| CN | 107248881 A | 10/2017 |
| CN | 107889274 A | 4/2018 |
| WO | WO 2016/057098 A2 | 4/2016 |

OTHER PUBLICATIONS

Combined Chinese Office Action and Search Report dated Sep. 1, 2021 in Patent Application No. 201880000666.3 (with English language translation), citing documents 1, 15, and 16 therein, 21 pages.

* cited by examiner

INFORMATION SENDING AND RECEIVING METHOD AND APPARATUS, DEVICE, AND STORAGE MEDIUM

CROSS REFERENCE

This application is the 371 application of PCT Application No. PCT/CN2018/091248, filed Jun. 14, 2018, titled "INFORMATION SENDING AND RECEIVING METHOD AND APPARATUS, DEVICE, AND STORAGE MEDIUM", the entire contents of which are incorporated herein by reference.

TECHNICAL FIELD

Embodiments of the present disclosure relate to the field of communication technology, including to a method for sending information, a method for receiving information, apparatus, device, and storage medium.

BACKGROUND

Nowadays, unmanned aerial vehicles (UAVs) have been applied in many scenarios. Operation modes of UAV include fixed mode and dynamic mode. The fixed mode indicates an operation mode operating according to a planned flight route, and the dynamic mode indicates an operation mode operating according to real-time control of the controller. The UAV will switch between the above two different operation modes during the operation of the UAV.

SUMMARY

Embodiments of the present disclosure provide a method for sending information, method for receiving information, apparatus, device, and storage medium. The technical solutions are described as follows.

According to a first aspect of the present disclosure, a method for sending information is provided. The method can include an unmanned aerial vehicle (UAV) operating in a first operation mode when the UAV is in an inactive state. The UAV can switch from the first operation mode to a second operation mode different from the first operation mode, and send, by the UAV, information to an access network device, the information being used for indicating a change of operation mode of the UAV.

According to a second aspect of the present disclosure, a method for receiving information is provided. The method can include receiving, by an access network device, information sent by an unmanned aerial vehicle (UAV) when the UAV is in an inactive state, and the information being used for indicating a change of operation mode of the UAV. The method can further include determining, by the access network device, a second operation mode to which the UAV is switched according to the information, and controlling, by the access network device, the UAV by applying a control strategy corresponding to the second operation mode.

According to a third aspect of the present disclosure, an apparatus for sending information is provided. The apparatus is configured to be applied in an unmanned aerial vehicle (UAV) and can include an operating module that is configured to operate in a first operation mode when the UAV is in an inactive state, and the operating module is further configured to switch from the first operation mode to a second operation mode different from the first operation mode. The apparatus can further include a sending module that is configured to send information to an access network device, and the information is used for indicating a change of operation mode of the UAV.

According to a fourth aspect of the embodiments of the present disclosure, an apparatus for receiving information is provided, and the apparatus is configured to be applied in an access network device. The apparatus can include a receiving module that is configured to receive information sent by an unmanned aerial vehicle (UAV) when the UAV is in an inactive state, and the information is used for indicating a change of operation mode of the UAV, a determining module that is configured to determine, according to the information, a second operation mode to which the UAV is switched, and a controlling module that is configured to control the UAV by applying a control strategy corresponding to the second operation mode.

According to a fifth aspect of the present disclosure, an unmanned aerial vehicle (UAV) is provided. The UAV can include a processor and a memory that is configured to store processor-executable instructions which, when executed by the processor, cause the processor to operate in a first operation mode when the UAV is in an inactive state, switch from the first operation mode to a second operation mode different from the first operation mode, and send information to an access network device, where the information is used for indicating a change of operation mode of the UAV.

According to a sixth aspect of the present disclosure, an access network device is provided. The access network device can include a processor and a memory that is configured to store processor-executable instructions which, when executed by the processor, cause the processor to receive information sent by an unmanned aerial vehicle (UAV) in an inactive state, and the information being used for indicating a change of operation mode of the UAV, determine, according to the information, a second operation mode to which the UAV is switched, and control the UAV by applying a control strategy corresponding to the second operation mode.

According to a seventh aspect of the present disclosure, a non-transitory computer readable storage medium, having a computer program stored thereon, is provided, and the computer program, when executed by a processor, implements the steps of the method according to the first aspect of the present disclosure.

According to an eighth aspect of the embodiments of the present disclosure, a non-transitory computer readable storage medium, having a computer program stored thereon, is provided, and the computer program, when executed by a processor, implements the steps of the method according to the second aspect of the present disclosure.

It should be understood that the above general description and the following detailed description are only exemplary and explanatory, and should not be construed to limit the present disclosure.

BRIEF DESCRIPTION OF THE DRAWINGS

Drawings herein, which are incorporated in and constitute a part of the description of the present disclosure, illustrate exemplary embodiments consistent with the present disclosure, and together with the description serve to explain the principles of the present disclosure.

DETAILED DESCRIPTION

The exemplary embodiments will be described in detail here, and examples thereof are shown in the accompanying drawings. In the following description relating to the drawings, unless otherwise indicated, the same numbers in different drawings indicate the same or similar elements. The implementations described in the following exemplary embodiments do not represent all implementations consistent with the present disclosure. Rather, they are merely examples of devices and methods consistent with some aspects of the present disclosure according to the appended claims.

Network architecture and business scenarios described in the embodiments of the present disclosure are intended to more clearly illustrate technical solutions of the embodiments of the present disclosure, and do not constitute a limitation on the technical solutions provided by the embodiments of the present disclosure. Those of ordinary skill in the art will know that with the evolution of network architecture and the emergence of new business scenarios, the technical solutions provided by the embodiments of the present disclosure can also applied to similar technical problems.

Figure 1:
FIG. 1 is a schematic diagram showing an application scenario according to an exemplary embodiment.

FIG. 1 is a schematic diagram showing an application scenario according to an exemplary embodiment. The application scenario can include a UAV 10 and an access network device 20.

The UAV 10 is the abbreviation of Unmanned Aerial Vehicle (UAV), and is an unmanned aircraft operated by radio remote control equipment and self-provided program control device. UAV is actually a general term for unmanned aerial vehicles, which can include: unmanned fixed-wing aircraft, unmanned vertical take-off and landing aircraft, unmanned airships, unmanned helicopters, unmanned multi-rotor aircraft, unmanned para-wing aircraft, etc.

The UAV 10 has been widely used in aerial photography, agriculture, plant protection, micro selfie, express transportation, disaster rescue, observation of wild animals, monitoring of infectious diseases, surveying and mapping, news reports, power inspections, disaster relief, film and television shooting, romantic creation, and the like. In order to further expand the application range of the UAV 10, relevant international standards organizations have also established a project to study and standardize how the cellular network can provide the UAV 10 with services that meet needs.

The access network device 20 is a device provided in a Radio Access Network (RAN) and used to provide services for the drone 10. A wireless connection can be established between the UAV 10 and the access network device 20. For example, the UAV 10 and the access network device 20 communicate with each other through a certain air interface technology, such as through cellular technology. The access network device 20 can control the UAV 10 through the above-mentioned wireless connection, and the UAV 10 can operate under the control of the access network device 20.

In some embodiments, the access network device 20 is used to provide services not only for the UAV 10, but also for terminals. The terminals may include various handheld devices, vehicle-mounted devices, wearable devices, computing devices with wireless communication functions or other processing devices connected to wireless modems, as well as various User Equipment (UE), and Mobile Station (MS), terminal device, and the like. For ease of description, the devices above are collectively referred to as terminals.

The access network device 20 may be a Base Station (BS), which is a device provided in the RAN to provide a wireless communication function for the terminal. The base station may include various macro base stations, micro base stations, relay stations, access points, and so on. In systems using different wireless access technologies, names of devices with base station functions may be different. For example, in LTE systems, it is called evolved Node B (evolved NodeB, eNB or eNodeB); in 3G communication systems, it is called Node B, and so on. With development of communication technology, the name "Base Station" may change. For ease of description, in the embodiments of the present disclosure, the above devices that provide wireless communication functions for terminals are collectively referred to as access network devices.

The technical solutions described in the embodiments of the present disclosure may be applicable to any Long Term Evolution (LTE) systems, and may also be applicable to subsequent evolution systems of LTE systems, such as LTE-Advanced (LTE-A) systems, 5G systems (also called NR (New Radio) system), and so on.

Figure 2:
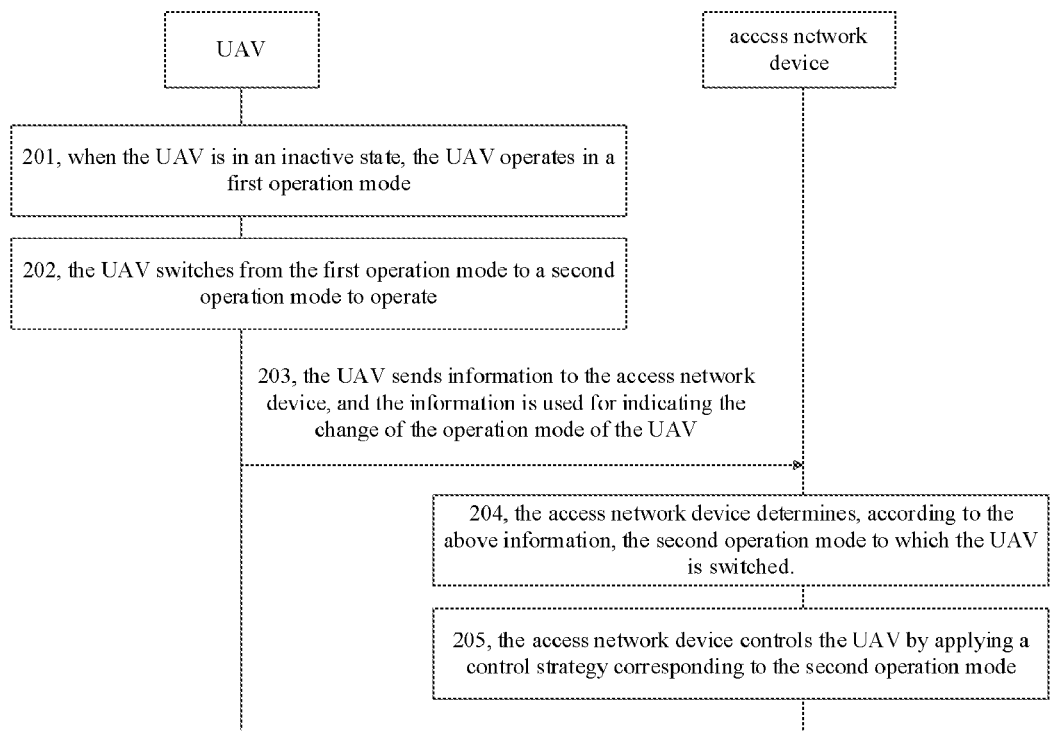
FIG. 2 is a flow chart showing a method for sending information according to an exemplary embodiment.

FIG. 2 is a flow chart showing a method for sending information according to an exemplary embodiment. This method can be applied to the application scenario shown in FIG. 1. The method can include the following steps.

At step 201, when the UAV is in an inactive state, the UAV operates in a first operation mode. A wireless connection can be established between the UAV and the access network device, and signaling and/or data can be transmitted through the wireless connection. For example, the access network device sends control signaling to the UAV through the wireless connection, thereby controlling the UAV, and the UAV operates according to the above control signaling. For another example, the UAV sends its operating data or collected business data to the access network device through the wireless connection. In one embodiment, the above wireless connection is an RRC connection.

In some embodiments, based on state of the wireless connection, state of the UAV may include an idle state, a connected state, and an inactive state. The idle state means that there is no wireless connection established between the UAV and the access network device. The connected state means that a wireless connection has been established between the UAV and the access network device, and the wireless connection is an active state. The inactive state means that a wireless connection has been established between the UAV and the access network device, but the wireless connection is in an inactive state. When the UAV is in the connected state, the UAV can directly interact with the access network device through the established wireless connection. When the UAV is in the inactive state, the UAV needs to recover the established wireless connection and then can interact with the access network device through the wireless connection.

In embodiments of the present disclosure, mainly for the UAV in the inactive state, when the operation mode of the UAV changes, a mechanism of the UAV reporting the change of the operation mode of the UAV to the access network device is provided such that the access network device may select an appropriate control strategy to control the UAV.

At step 202, the UAV switches from the first operation mode to a second operation mode to operate. The first operation mode and the second operation mode are two different operation modes.

In some embodiments, the operation mode of the UAV includes a fixed mode and a dynamic mode. The fixed mode indicates an operation mode operating according to a planned flight route. For example, a user can plan a flight route of the UAV on a controller, so that the UAV can fly according to the planned flight route, and the controller does not need to control the UAV in real time. The dynamic mode indicates an operation mode operating according to real-time control of the controller. For example, the controller may perform real-time control of flight state, such as direction, altitude, and speed, of the UAV.

In some embodiments, the first operation mode is a fixed mode, and the second operation mode is a dynamic mode.

In some embodiments, when a switching instruction sent by the controller is received by the UAV, the UAV switches from the first operation mode to the second operation mode according to the switching instruction. For example, when the user needs to change the operation mode of the UAV, they can send the switching instruction to the UAV through the controller.

At step 203, the UAV sends information to the access network device, and the information is used for indicating the change of the operation mode of the UAV. Correspondingly, the information sent by the UAV is received by the access network device.

In some embodiments, the above information includes indication information corresponding to the second operation mode. For example, the indication information is represented by 1 bit. For example, when "0" represents the first operation mode and "1" represents the second operation mode, the indication information included in the above information is "1". For another example, when "0" represents the second operation mode and "1" represents the first operation mode, the indication information included in the above information is "0". By carrying the indication information corresponding to the second operation mode in the above information, after receiving the above information, the access network device can directly obtain, from the above information, the operation mode to which the UAV is switched.

In some embodiments, since the operation mode of the UAV is changed when the UAV is in an inactive state, the UAV may carry the above information in the RRC connection recovery request and send it to the access network device. The UAV sends an RRC connection recovery request to the access network device, and the above information is carried in the RRC connection recovery request. Correspondingly, the RRC connection recovery request sent by the UAV is received by the access network device. The RRC connection recovery request is used to request to recover the wireless connection established between the UAV and the access network device, for example, switching the wireless connection from an inactive state to an active state.

It should be noted that, in the exemplary embodiment of the present disclosure, the order of performing the above steps 202 and 203 is not limited. For example, step 203 can be performed after step 202. That is, the UAV reports the above information to the access network device after the UAV completes the switching of the operation mode. For another example, step 203 can be performed simultaneously with step 202. That is, the UAV reports the above information to the access network device when the switching of the operation mode of the UAV is performed. Alternatively, step 203 can also be performed before step 202. That is, when the UAV determines that the operation mode needs to be switched, it first reports the above information to the access network device, and then performs the switching of the operation mode.

At step 204, the access network device determines, according to the above information, the second operation mode to which the UAV is switched. In an example, when the above information includes indication information corresponding to the second operation mode, the access network device determines, according to the indication information, the second operation mode to which the UAV is switched.

In another example, the operation mode of the UAV is recorded in the access network device, and when the access network device receives the above information, it can be obtained that the operation mode of the UAV has changed. If the operation mode of the UAV recorded in the access network device is the first operation mode, the access network device can determine that the UAV is switched from the first operation mode to the second operation mode.

At step 205, the access network device controls the UAV by applying a control strategy corresponding to the second operation mode. For example, when the second operation mode is the dynamic mode, after the access network device determines that the UAV is switched to the dynamic mode, the access network device control the UAV by using the control strategy corresponding to the dynamic mode, for example, the access network device no longer uses the planned flight route as auxiliary information to improve the mobile performance of the UAV. According to the different operation modes of the UAV, the access network device will apply different control strategies to achieve accurate control of the UAV. The control strategy includes, but is not limited to, the strategy for controlling operating state of the UAV, such as the flight state and the business state, and the specific content of the control strategy is not limited in the embodiment of the present disclosure.

In an implementation, after determining the second operation mode to which the UAV is switched, the access network device may send state change information to the UAV. The state change information is used for indicating the UAV to switch from the inactive state to the connected state. For example, the access network device sends an RRC connection recovery response to the UAV, and the RRC connection recovery response carries state change information. After receiving the state change information, the UAV switches from the inactive state to the connected state. The UAV under the connected state can perform real-time data transmission and reception with the access network device.

In another implementation, after determining the second operation mode to which the UAV is switched, the access network device may send state maintenance information to the UAV. The state maintenance information is used for indicating the UAV to maintain the inactive state. For example, the access network device sends an RRC connection recovery response to the UAV, and the RRC connection recovery response carries state maintenance information. After receiving the state maintenance information, the UAV maintain the inactive state. Although the UAV under the inactive state cannot perform real-time data transmission and reception with the access network device, it can save power consumption and electric power compared to the connected state. Alternatively, if the access network device requires the UAV to remain in the inactive state, it may not send state maintenance information to the UAV, the UAV may maintain the inactive state by default when not receiving the state change information sent by the access network device.

It should be noted that, after the access network device determines the second operation mode to which the UAV switches, it can be determined, according to the actual business scenario, whether to control the UAV to switch from the inactive state to the connected state, or to control the UAV to maintain inactive state, and which is not limited in the embodiments of the present disclosure. For example, in the case of high requirement for real-time data transmission and reception, the UAV can be controlled to switch from the inactive state to the connected state. For another example, in the case of low requirement for the real-time data transmission and reception but high power saving requirement, the UAV can maintain the inactive state. In this way, the network side can control the wireless connection state of the UAV. In addition, in other possible implementations, the UAV may be controlled, by itself, to switch from the inactive state to the connected state or maintain the inactive state instead of being controlled by the access network device.

To sum up, in the technical solution provided by the exemplary embodiments of the present disclosure, for a UAV under an inactive state, when the operation mode of the UAV changes, a mechanism of the UAV reporting the change of the operation mode thereof to the access network device is provided, so that the access network device can change the control strategy of the UAV in time to ensure accurate and normal operation of the UAV.

In addition, by sending the RRC connection recovery request carrying the information used for indicating the change of the operation mode of the UAV, additional signaling messages can be omitted.

In the above method embodiment, the technical solution of the present disclosure is explained only in view of the interaction between the UAV and the access network device. The above-mentioned steps related to the UAV side can be separately implemented as a method for sending information on the UAV side, and the above-mentioned steps related to the access network device side can be separately implemented as a method for receiving information on the access network device side.

The following are apparatus embodiments of the present disclosure, which can be used to implement the method embodiments of the present disclosure. For details that are not described in the apparatus embodiments of the present disclosure, please refer to the method embodiments of the present disclosure.

Figure 3:
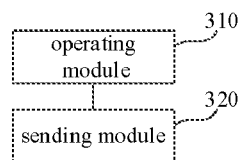
FIG. 3 is a block diagram showing an apparatus for sending information according to an exemplary embodiment.

FIG. 3 is a block diagram showing an apparatus for sending information according to an exemplary embodiment. The apparatus has the function of realizing the examples of the method on the UAV side, and the function can be realized by hardware, or by hardware executing corresponding software. The apparatus can be used in UAVs. The apparatus may include: an operating module 310 and a sending module 320.

The operating module 310 is configured to operate in the first operation mode when the UAV is in the inactive state. The operating module 310 is also configured to switch from the first operation mode to the second operation mode, and the first operation mode and the second operation mode are two different operation modes.

The sending module 320 is configured to send information to the access network device, and the information is used for indicating that the operation mode of the UAV has changed.

To sum up, in the technical solution provided by the exemplary embodiments of the present disclosure, for a UAV under an inactive state, when the operation mode of the UAV changes, a mechanism of the UAV reporting the change of the operation mode thereof to the access network device is provided, so that the access network device can change the control strategy of the UAV in time to ensure accurate and normal operation of the UAV.

In an embodiment according to FIG. 3, the sending module 320 is configured to send an RRC connection recovery request to the access network device, and the information is carried in the RRC connection recovery request.

In another embodiment according to FIG. 3 or based on the above embodiments, the information includes indication information corresponding to the second operation mode.

In another embodiment according to FIG. 3 or based on the above embodiments, the first operation mode is a fixed mode, and the second operation mode is a dynamic mode. The fixed mode refers to an operation mode that the UAV operates according to a planned flight route, and the dynamic mode refers to an operation mode that the UAV operates according to real-time control of the controller.

In another embodiment according to FIG. 3 or based on the above embodiments, the apparatus further includes a receiving module that is configured to receiving state change information sent by the access network device, and the state change information being used for indicating the UAV to switch from the inactive state to the connected state, or receiving state maintenance information sent by the access network device, and the state maintenance information being used for indicating the UAV to maintain the inactive state.

Figure 4:
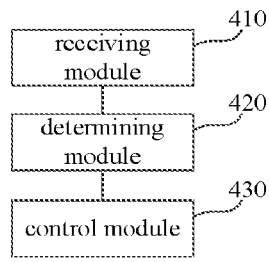
FIG. 4 is a block diagram showing an apparatus for receiving information according to an exemplary embodiment.

FIG. 4 is a block diagram showing an apparatus for receiving information according to an exemplary embodiment. The apparatus has the function of realizing the method embodiments on the side of the access network device described above, and the function can be realized by hardware, or by hardware executing corresponding software. The apparatus can be used in the access network device. The apparatus may include: a receiving module 410, a determining module 420, and a control module 430.

The receiving module 410 is configured to receive information sent by the UAV when the UAV is in an inactive state, and the information is used for indicating a change of the operation mode of the UAV.

The determining module 420 is configured to determine, according to the information, the second operation mode to which the UAV is switched.

The control module 430 is configured to control the UAV by applying a control strategy corresponding to the second operation mode.

To sum up, in the technical solution provided by the exemplary embodiments of the present disclosure, for a UAV under an inactive state, when the operation mode of the UAV changes, a mechanism of the UAV reporting the change of the operation mode thereof to the access network device is provided, so that the access network device can change the control strategy of the UAV in time to ensure accurate and normal operation of the UAV.

In an embodiment according to FIG. 4, the receiving module 410 is configured to receive the RRC connection recovery request sent by the UAV in the inactive state, and the information is carried in the RRC connection recovery request.

In another embodiment according to FIG. 4 or based on the above embodiments, the apparatus further includes a sending module that is configured to sending state change information to the UAV, and the state change information being used for indicating the UAV to switch from the inactive state to the connected state, or sending the state maintenance information to the UAV, and the state maintenance information is used for indicating the UAV to maintain the inactive state.

It should be noted that, when the functions are performed by the apparatus according to the above embodiments, the above modules based on the functions is described as examples. In actual applications, the above functions can be allocated into different functional modules according to actual needs. That is, the content structure of the apparatus may be divided into different functional modules to complete all or part of the functions described above. Further, it should of course be understood that one or more of the modules described in this disclosure can be implemented by circuitry.

In the apparatus according to the above embodiments, the specific manner in which each modules performs operation has been described in detail in the method embodiments, and same description will not be repeated here.

An exemplary embodiment of the present disclosure also provides a UAV, which can implement the method for sending information provided by the present disclosure. The UAV includes a processor and a memory for storing instructions executable by the processor. The processor is configured to operate in the first operation mode, when the UAV is in an inactive state, switch from the first operation mode to the second operation mode different from the first operation mode, and send information to the access network device, where the information being used for indicating the change of the operation mode of the UAV.

In some embodiments, the processor is configured to send an RRC connection recovery request carrying the information to the access network device. In some embodiments, the information includes indication information corresponding to the second operation mode. Further, in some embodiments, the first operation mode is a fixed mode, and the second operation mode is a dynamic model. The fixed mode refers to an operation mode that the UAV operates according to a planned flight route, and the dynamic mode refers to an operation mode that the UAV operates according to real-time control of the controller.

In some embodiments, the processor is further configured to receive the state change information sent by the access network device, the state change information being used for indicate the UAV to switch from the inactive state to the connected state, or receive state maintenance information sent by the access network device, the state maintenance information being used for indicating the UAV to maintain the inactive state.

An exemplary embodiment of the present disclosure also provides an access network device, which can implement the method for receiving information provided by the present disclosure. The access network device includes a processor and a memory for storing instructions executable by the processor. The processor is configured to receive information sent by the UAV in the inactive state, the information being used for indicating the change of the operation mode of the UAV, determine, according to the information, the second operation mode to which the UAV is switched, and control the UAV by applying a control strategy corresponding to the second operation mode.

In some embodiments, the processor is configured to receive a RRC connection recovery request sent by the UAV in the inactive state, the RRC connection recovery request carrying the information. In additional exemplary embodiments, the processor is further configured to send state change information to the UAV, the state change information being used for indicating the UAV to switch from the inactive state to the connected state, or send state maintenance information to the UAV, the state maintenance information being used for indicating the UAV to maintain the inactive state.

An exemplary embodiment of the present disclosure also provides an information sending system, which includes the UAV and the access network device described above.

The above UAV and access network device are taken as examples to explain the solutions provided by the embodiments of the present disclosure. It can be understood that, in order to realize the above-mentioned functions, the UAV and the access network device include hardware structures and/or software modules corresponding to each function. In combination with the units and algorithm steps of the examples described in the embodiments disclosed in the present disclosure, the embodiments of the present disclosure can be implemented in the form of hardware or a combination of hardware and computer software. Whether a function is executed by hardware or computer software-driven hardware depends on the specific application and design constraints of the technical solution. Those skilled in the art may use different methods for each specific application to implement the described functions, but such implementation should not be considered as going beyond the scope of the technical solutions of the embodiments of the present disclosure.

Figure 5:
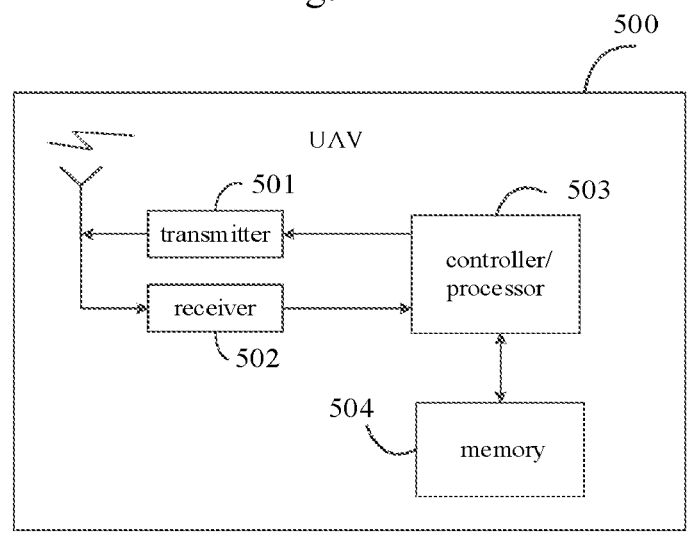
FIG. 5 is a schematic structural diagram of a UAV according to an exemplary embodiment.

FIG. 5 is a schematic structural diagram of a UAV according to an exemplary embodiment. As shown, the UAV 500 includes a transmitter 501, a receiver 502, and a processor 503. The processor 503 may also be a controller, which is represented as "controller/processor 503" in FIG. 5.

The processor 503 controls and manages actions of the UAV 500, and is used to execute the processing procedure performed by the UAV 500 in the above embodiments of the present disclosure. For example, the processor 503 is configured to execute each step on the UAV side in the foregoing method embodiments, and/or other steps of the technical solution described in the embodiment of the present disclosure.

Further, the UAV 500 may further include a memory 504, and the memory 504 is used to store program code and data for the UAV 500.

It can be understood that FIG. 5 only shows a simplified design of the UAV 500. In practical applications, the UAV 500 may include any number of transmitters, receivers, processors, controllers, memories, etc., and all UAVs that can implement the embodiments of the present disclosure are within the protection scope of the embodiments of the present disclosure.

Figure 6:
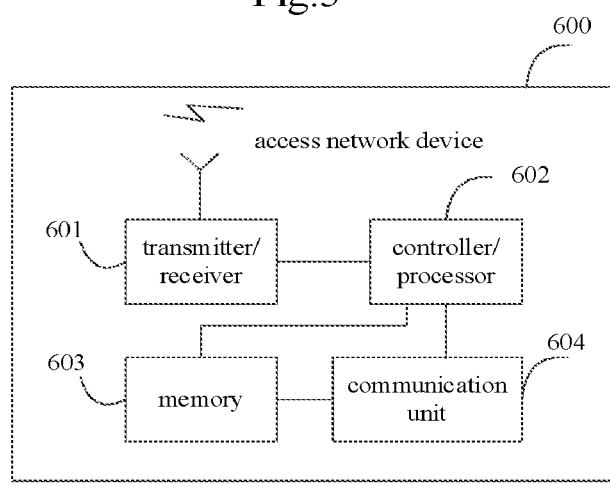
FIG. 6 is a schematic structural diagram showing an access network device according to an exemplary embodiment.

FIG. 6 is a schematic structural diagram showing an access network device according to an exemplary embodiment. As shown, the access network device 600 includes a transmitter/receiver 601 and a processor 602. The processor 602 may also be a controller, which is represented as "controller/processor 602" in FIG. 6. The transmitter/receiver 601 is used to support the sending and receiving of information between the access network device 600 and UAVs, terminals, and other devices, and to support communication between the access network device 600 and other network entities. The processor 602 performs various functions for communicating with UAVs or other devices. For example, the processor 602 is configured to execute each step of the access network device side in the above method embodiments, and/or other steps of the technical solution described in the embodiment of the present disclosure.

Further, the access network device 600 may further include a memory 603 for storing program code and data of the access network device 600. In addition, the access network device 600 may further include a communication unit 604. The communication unit 604 is configured to support the access network device 600 to communicate with other network entities (for example, network devices in a core network, etc.). For example, in an LTE system, the communication unit 604 may be an S1-U interface, which is used to support the access network device 600 to communicate with a Serving Gateway (S-GW). Alternatively, the communication unit 604 may also be an S1-MME interface used for supporting communication between the access network device 600 and a mobility management entity (MME).

It can be understood that FIG. 6 only shows a simplified design of the access network device 600. In practical applications, the access network device 600 may include any number of transmitters, receivers, processors, controllers, memories, communication units, and the like, and all access network devices that can implement the embodiments of the present disclosure are within the protection scope of the embodiments of the present disclosure.

The processor used to perform the functions of the UAV or access network device in the embodiments of the present disclosure may be a central processing unit (Central Processing Unit, CPU), a general processor, a digital signal processor (Digital Signal Processor, DSP), Application-Specific Integrated Circuit (ASIC), Field Programmable Gate Array (FPGA) or other programmable logic devices, transistor logic devices, hardware components or any combination thereof. It can implement or execute various exemplary logical blocks, modules and circuits described in conjunction with the disclosure of the embodiments of the present disclosure. The processor may also be a combination of computing functions, for example, a combination of one or more microprocessors, a combination of a DSP and a microprocessor, and so on.

The steps of the methods or algorithm described in conjunction with the embodiments of the present disclosure may be implemented in a hardware, or may be implemented in a manner that a processor executes software instructions. Software instructions can be composed of corresponding software modules. The software modules can be stored in random access memory (RAM), flash memory, read only memory (ROM), and erasable programmable read-only memory (Erasable Programmable ROM, EPROM), electrically erasable programmable read-only memory (Electrically EPROM, EEPROM), register, hard disk, portable hard disk, CD-ROM or any other form of storage medium known in the art. An exemplary storage medium is coupled to the processor, so that the processor can read information from the storage medium and can write information to the storage medium. Also, the storage medium may be an integral part of the processor. The processor and the storage medium may be located in the ASIC. In addition, the ASIC can be located in a UAV or an access network device. Alternatively, the processor and the storage medium may be provided in the UAV or the access network device as discrete components.

Those skilled in the art should be aware that, in one or more of the foregoing examples, the functions described in the embodiments of the present disclosure may be implemented by hardware, software, firmware, or any combination thereof. When implemented by software, these functions can be stored in a computer-readable medium or sent as one or more instructions or codes on the computer-readable medium. The computer-readable medium includes a computer storage medium and a communication medium, and the communication medium includes any medium that facilitates to transfer a computer program from one place to another. The storage medium may be any available medium that can be accessed by a general-purpose or special-purpose computer.

The embodiments of the present disclosure also provide a non-transitory computer-readable storage medium on which a computer program is stored, and when the computer program is executed by the processor of the UAV, the steps of the above method for sending information are realized.

The embodiments of the present disclosure also provide a non-transitory computer-readable storage medium on which a computer program is stored, and when the computer program is executed by a processor of an access network device, the steps of the above method for receiving information are realized.

It should be understood that the "plurality" mentioned herein refers to two or more, and "and/or" describes the association relationship of the associated objects, indicating that there can be three types of relationships. For example, the phrase "A and/or B" can mean the following three situations: (1) only A exists; (2) both A and B exist; and (3) only B exists. The character "/" generally indicates that the associated objects separated by the character "/" are in an "or" relationship.

Those skilled in the art will easily think of other embodiments of the present disclosure after considering the description and practicing the embodiments disclosed herein. This application is intended to cover any variations, uses, or adaptive changes of the present disclosure. These variations, uses, or adaptive changes follow the general principles of the present disclosure. The description and the embodiments are only regarded as exemplary, and the true scope and spirit of the present disclosure are defined by the following claims.

It should be understood that the present disclosure is not limited to the precise structure that has been described above and shown in the drawings, and various modifications and changes can be made without departing from the scope. The scope of the present disclosure is only limited by the appended claims.

What is claimed is:

1. A method for sending information, performed by an unmanned aerial vehicle (UAV), comprising:
operating in a first operation mode when the UAV is in an inactive state;
switching from the first operation mode to a second operation mode that is different from the first operation mode;
sending a radio resource control (RRC) connection recovery request to an access network device, wherein the RRC connection recovery request carries information, and the information is used for indicating a change of operation mode of the UAV; and
receiving, in a first scenario, state change information sent by the access network device, wherein the state change information is used for indicating the UAV to switch from the inactive state to a connected state; or receiving, in a second scenario, state maintenance information sent by the access network device, wherein the state maintenance information is used for indicating the UAV to maintain the inactive state;

wherein requirements of the first scenario for real-time data transmission and reception is higher than requirements of the second scenario for real-time data transmission and reception.

2. The method according to claim 1, wherein the information further comprises indication information corresponding to the second operation mode.

3. The method according to claim 1, wherein:
the first operation mode is a fixed mode and the second operation mode is a dynamic mode, and
the UAV operates according to:
a planned flight route in the fixed mode, and
a real-time control of a controller in the dynamic mode.

4. The method according to claim 1, further comprising:
receiving, before switching from the first operation mode to the second operation mode, a switching instruction sent by a controller.

5. The method according to claim 1, wherein the state change information or the state maintenance information is comprised in an RRC connection recovery response sent by the access network device.

6. A method for receiving information, comprising:
receiving, by an access network device, a radio resource control (RRC) connection recovery request sent by an unmanned aerial vehicle (UAV) when the UAV is in an inactive state, wherein the RRC connection recovery request carries information, and the information is used for indicating a change of operation mode of the UAV;
determining, by the access network device, a second operation mode to which the UAV is switched based on the information;
controlling, by the access network device, the UAV by applying a control strategy corresponding to the second operation mode; and
sending, by the access network device, in a first scenario, state change information to the UAV, wherein the state change information is used for indicating the UAV to switch from the inactive state to a connected state; or
sending, by the access network device, in a second scenario, state maintenance information to the UAV, wherein the state maintenance information is used for indicating the UAV to maintain the inactive state;
wherein requirements of the first scenario for real-time data transmission and reception is higher than requirements of the second scenario for real-time data transmission and reception.

7. The method according to claim 6, wherein the access network device sends the state change information or the state maintenance information in an RRC connection recovery response.

8. The method according to claim 6, wherein the access network device determines the first scenario and the second scenario according to an actual business scenario.

9. An apparatus for sending information that is configured to perform the method recited in claim 1 and to be applied in the UAV, comprising:
an operating module that is configured to operate in a first operation mode when the UAV is in an inactive state, wherein the operating module is further configured to switch from the first operation mode to a second operation mode different from the first operation mode;
a first sending module that is configured to send a radio resource control (RRC) connection recovery request to an access network device, wherein the RRC connection recovery request carries information, and the information is used for indicating a change of operation mode of the UAV; and a first receiving module that is configured to receive, in a first scenario, state change information sent by the access network device, wherein the state change information is used for indicating the UAV to switch from the inactive state to a connected state, and to receive, in a second scenario, state maintenance information sent by the access network device, wherein the state maintenance information is used for indicating the UAV to maintain the inactive state;

wherein requirements of the first scenario for real-time data transmission and reception is higher than requirements of the second scenario for real-time data transmission and reception.

10. The apparatus according to claim 9, wherein the information further comprises indication information corresponding to the second operation mode.

11. The apparatus according to claim 9, wherein the first operation mode is a fixed mode and the second operation mode is a dynamic mode, and
the UAV operates according to:
a planned flight route in the fixed mode, and
a real-time control of a controller in the dynamic mode.

12. The apparatus according to claim 9, wherein the first receiving module is further configured to receive, before switching from the first operation mode to the second operation mode, a switching instruction sent by a controller.

13. The apparatus according to claim 9, wherein the state change information or the state maintenance information is comprised in an RRC connection recovery response sent by the access network device.

14. An apparatus for receiving information that is configured to perform the method recited in claim 6 and to be applied in the access network device, comprising:
a second receiving module that is configured to receive a radio resource control (RRC) connection recovery request sent by the UAV when the UAV is in an inactive state, wherein the RRC connection recovery request carries information, and the information is used for indicating a change of operation mode of the UAV;
a determining module that is configured to determine a second operation mode to which the UAV is switched based on the information;
a controlling module that is configured to control the UAV by applying a control strategy corresponding to the second operation mode; and
a second sending module that is configured to send, in a first scenario, state change information to the UAV, wherein the state change information is used for indicating the UAV to switch from the inactive state to a connected state, and to send, in a second scenario, state maintenance information to the UAV, wherein the state maintenance information is used for indicating the UAV to maintain the inactive state;
wherein requirements of the first scenario for real-time data transmission and reception is higher than requirements of the second scenario for real-time data transmission and reception.

15. The apparatus according to claim 14, wherein the second sending module is further configured to send the state change information or the state maintenance information in an RRC connection recovery response.

16. The apparatus according to claim 14, where the determining module is further configured to determine the first scenario and the second scenario according to an actual business scenario.

17. An unmanned aerial vehicle (UAV), comprising:
a processor; and
a memory that is configured to store non-transitory processor-executable instructions which, when executed by the processor, cause the processor to perform the method recited in claim 1.

18. An access network device, comprising:
a processor;
a memory that is configured to store non-transitory processor-executable instructions which, when executed by the processor, cause the processor to perform the method recited in claim 6.

* * * * *